United States Patent [19]

Whaley et al.

[11] 4,266,820
[45] May 12, 1981

[54] VARIANCE COMPENSATING COUPLER FOR CONTAINER-CARRYING TRAILER CHASSIS

[75] Inventors: Robert L. Whaley; James L. Day, both of Cincinnati, Ohio

[73] Assignee: Pullman Incorporated, Chicago, Ill.

[21] Appl. No.: 38,993

[22] Filed: May 14, 1979

[51] Int. Cl.³ .................................. B62D 23/00
[52] U.S. Cl. ........................... 296/35.3; 410/82
[58] Field of Search ............... 296/35.3; 410/77, 86; 248/503, 500; 24/221 R

[56] References Cited

U.S. PATENT DOCUMENTS

| | | | |
|---|---|---|---|
| 3,125,965 | 3/1964 | De Penti | 410/76 |
| 3,259,400 | 7/1966 | Tantlinger | 410/81 |
| 3,261,070 | 7/1966 | Abolins | 24/221 R |
| 3,317,236 | 5/1967 | Connerat | 410/82 |
| 3,604,363 | 9/1971 | Smith | 410/70 |
| 3,643,907 | 2/1972 | Ham | 248/439 |
| 3,691,595 | 9/1972 | Backteman | 24/81 E |
| 3,701,562 | 10/1972 | Carr | 410/82 |
| 3,717,373 | 2/1973 | Carr | 410/77 |
| 3,719,385 | 3/1973 | Carr | 410/77 |
| 3,734,442 | 5/1973 | Lunde | 410/77 |

Primary Examiner—Robert R. Song
Attorney, Agent, or Firm—Stephen D. Geimer; Richard J. Myers

[57] ABSTRACT

A locking mechanism for securing a container to a truck chassis is provided and includes a manually reciprocating locking member movable in a piston-like fashion through a housing from a retracted position within the housing to an extended position within a slot of a corner casting in an adjacent container. The reciprocating member is also rotatable and includes an eccentric locking pin to adjust the location of the locking pin to compensate for dimensional variations and to enable the locking pin search for the locking slot of a corner casting by moving between several positions.

12 Claims, 5 Drawing Figures

U.S. Patent May 12, 1981 Sheet 1 of 2 4,266,820
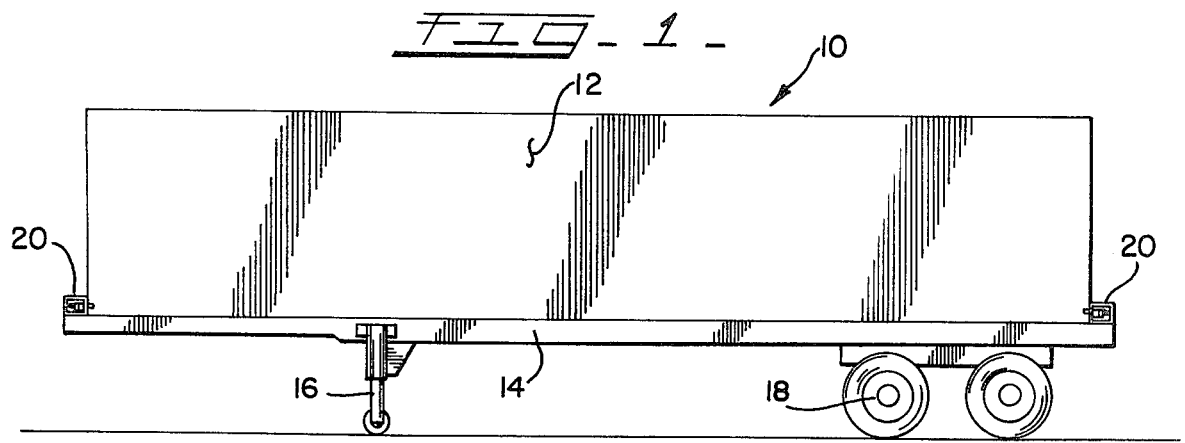
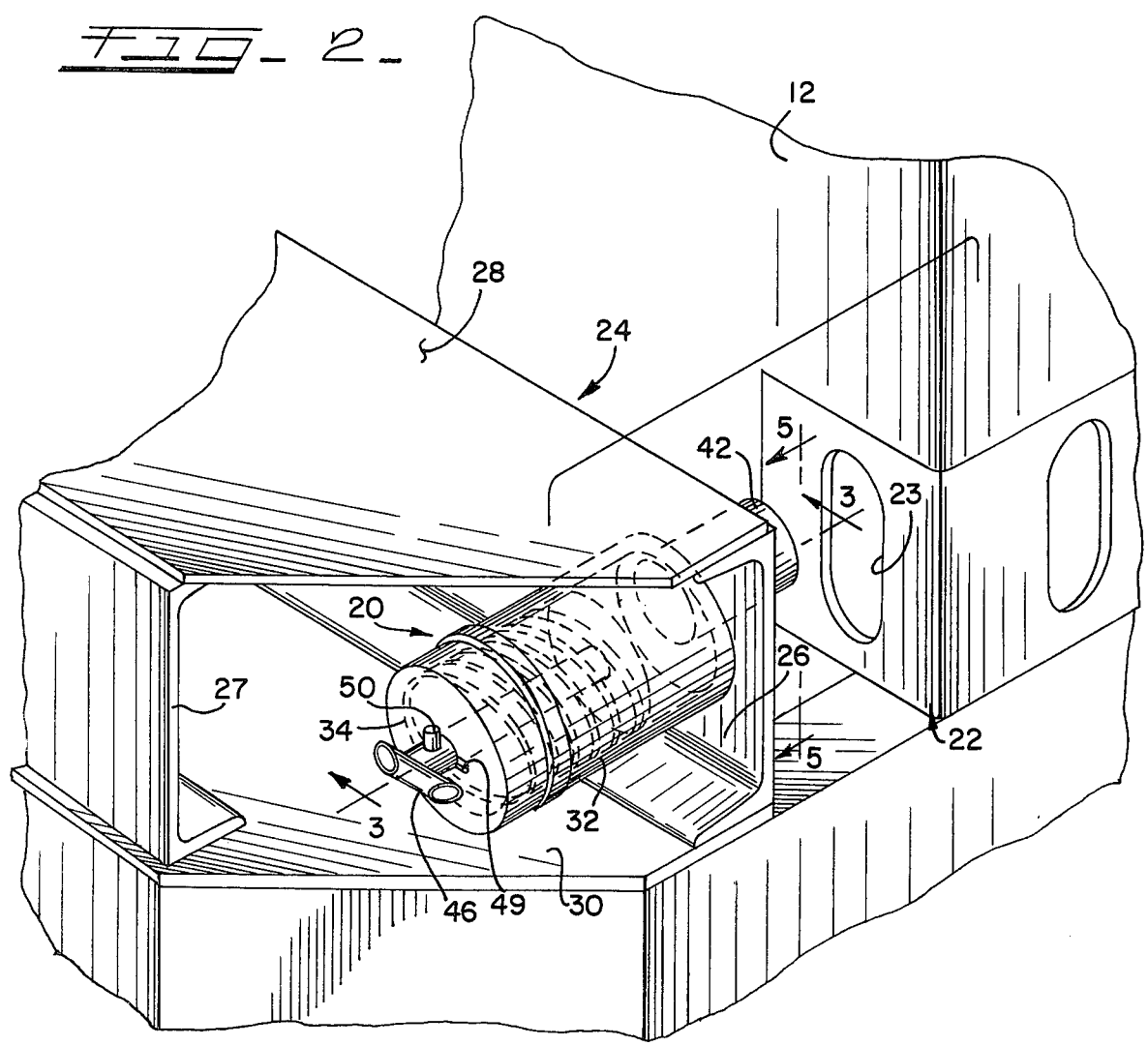

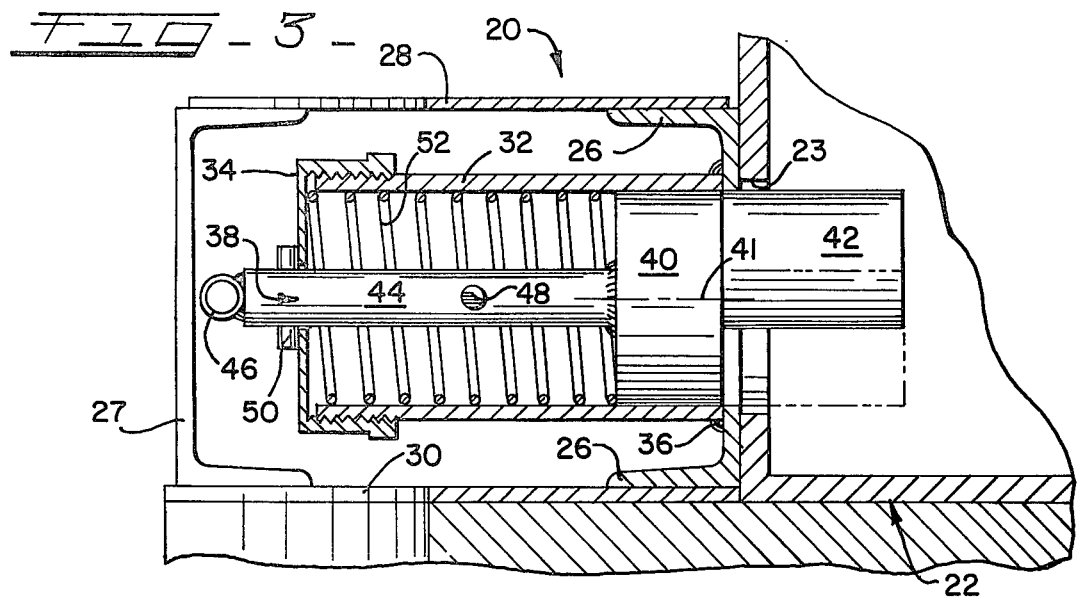
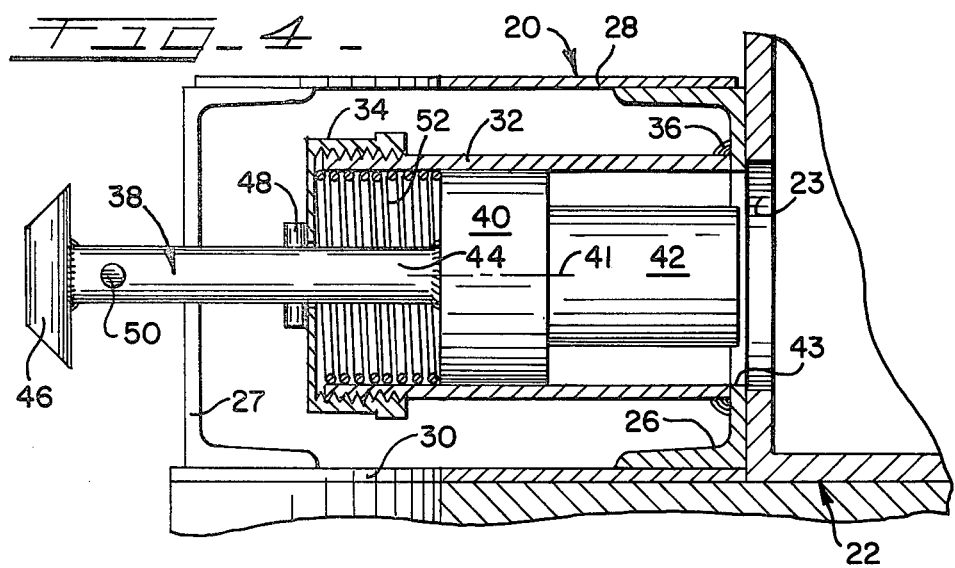
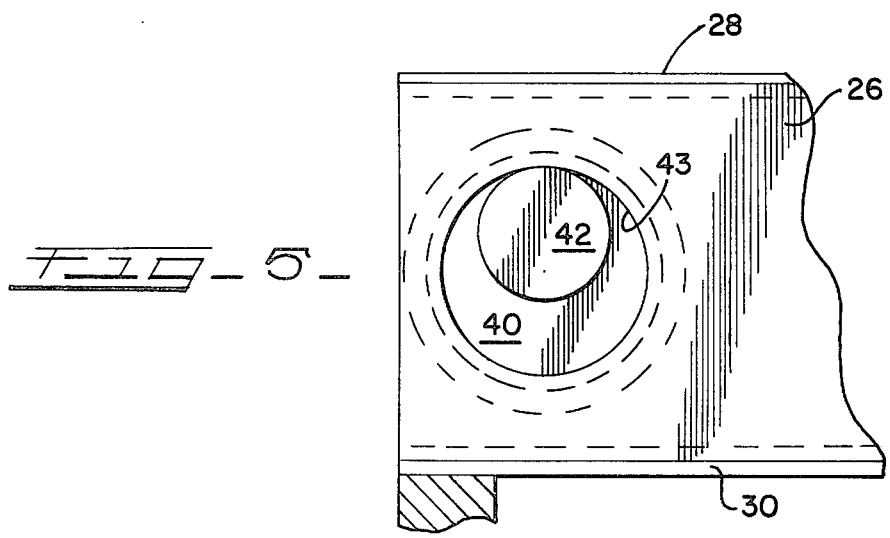

VARIANCE COMPENSATING COUPLER FOR CONTAINER-CARRYING TRAILER CHASSIS

BACKGROUND OF THE INVENTION

1. Field of the Invention

This disclosure pertains to a so-called hold-down mechanism for engaging a corner casting of a container and restricting the container from vertical movement during its transport. Specifically, the locking arrangement disclosed herein includes a reciprocable member having an eccentric or locking pin which may be rotated and adjusted to align with locking openings on a corner casting.

2. Description of the Prior Art

Prior art container hold-down mechanisms have generally provided a latch or hook mechanism which in some cases is spring biased to automatically engage and disengage from a container corner casting. Because of the various lengths of containers, some attempts such as the Smith U.S. Pat. No. 3,604,363 (1971) have been made to provide container hold-down devices which are movable along the length of the supporting chassis. While these movable hold-down devices have received some success in the market place, there are some inadequacies because once the hold-down member is set in place for holding 20 foot or 40 foot containers there is no mechanism provided for adjusting the location of the lock or hook to align with corner castings of containers which might vary slightly in location due to abuse received during handling or dimensional variations which occur during manufacturing.

Another type of container hold-down arrangement is shown in the Tantlinger et al, U.S. Pat. No. 3,259,400 (1966) which shows a container supported upon a chassis and restricted from vertical movement by a number of spring biased locking pins which move horizontally into aligned openings on the container. Such a locking arrangement is desirable for providing positive locking between the chassis and the container; however, like the earlier described patent, the locking mechanism is not provided with structure for adapting the mechanism to locate and fit into misaligned locking openings.

SUMMARY OF THE INVENTION

This disclosure pertains to a container hold-down mechanism and in particular to a chassis-mounted locking member which not only moves horizontally and reciprocably into a container corner casting but also has a rotatable locking member which includes an eccentric pin. Thus, as the locking member is rotated, the eccentric pin moves both laterally and vertically in such a fashion as to locate a misaligned locking opening on the associated corner casting of the container to be locked.

In operation, as a container is placed on the chassis, the locking member is held in a retracted position whereby a spring is compressed and a stop finger secures the locking pin in the retracted position until a handle is rotated to release the locking member and allow the spring to urge the eccentric pin into the associated opening of the corner casting or into contact with the portion of the misaligned corner casting. Thus, when an operator notices that the handle has not entered completely into its associated housing, the handle must be manually rotated in either direction until the eccentric pin finds the open space of the misaligned opening and moves horizontally and automatically, under spring force, into the opening to restrict vertical movement of the container.

It is an object of this disclosure to show a container locking and hold-down mechanism which moves between a retracted and locked position to securely hold the container in position.

It is another object of this disclosure to show a spring biased locking means which is movable reciprocably into and from a corner casting and which is rotatable and includes an eccentric pin. Thus, when the rotatable portion is rotated, the eccentric pin moves not only vertically but also horizontally or laterally to search out the misaligned opening of the corner casting.

It is yet another object of this disclosure to provide a container locking member having an operating handle and locking finger means associated with the handle for holding the handle in a retracted position.

It is another object of this disclosure to provide a container locking mechanism which may easily be attached to a chassis and includes a housing with a canister containing a removable cover and having a piston-type of operator within and urged by a compression spring into locking engagement with the corner casting.

These and other objects of the disclosure will be apparent to those having ordinary skill in the art with reference to the following drawings, description, and claims.

BRIEF DESCRIPTION OF THE DRAWINGS

FIG. 1 is a side elevational view of a container and its supporting chassis;

FIG. 2 is a pictorial illustration of a container corner casting and the locking mechanism of this disclosure;

FIG. 3 is a sectional view taken generally along lines 3—3 of FIG. 2;

FIG. 4 is a view similar to FIG. 3 but showing the operating handle and mechanism in the retracted or unlocked position; and FIG. 5 is a view taken generally along lines 5—5 of FIG. 2.

DESCRIPTION OF THE PREFERRED EMBODIMENT

Referring now to the drawings, and in particular to FIG. 1, there is shown a trailer 10 supporting a container 12. It is well known in the art that containerized transport systems generally use both 20 foot and 40 foot trailers. For the purposes of this disclosure, the drawings illustrate a typical 40 foot container on a supporting trailer or chassis 14. Chassis 14 includes the usual landing gear for support of the trailer when a driving tractor (not illustrated) is not used. The chassis 14 includes the usual truck and wheel arrangement 18.

In transporting these large, removable containers, it is necessary to provide a structural supporting arrangement which not only holds the container 12 securely in place to prevent horizontal movement during starting and stopping of the trailer, but it is also necessary to provide a hold-down arrangement to prevent unintentional vertical movement of the container which could occur from shocks or bumps encountered during transit. Consequently, there are regulations regarding container hold-down arrangements which specify that any locking arrangement must provide a locking pin or a locking member to prevent vertical movement as well as horizontal movement of the container during transit.

With this disclosure, a container coupler 20 is positioned on the chassis 14 to align with so-called corner castings 22 which are located at each of the bottom four corners of the chassis 14. Each corner casting 22 is integrally connected with the container framing and structurally rigid. Each corner casting 22 also includes a pair of vertically extending slots 23 which are positioned to align with locking members located on the chassis 14 to securely hold the container 12 in place.

As shown in FIG. 2, horizontal movement of the container in both a forward and rearward direction is prevented by the sills 24 which abut both the front and rear of the container 12. Each sill 24 includes a pair of spaced channel beams 26, 27 which are interconnected by both a top cover plate 28 and a bottom plate 30. This structural arrangement provides a rigid beam member which provides sufficient structure for holding the container securely in place by preventing horizontal movement.

The container coupler 20 is attached at each outer end of sills 24 and provides the mechanism for connecting the chassis 14 within the slot 23 of corner casting 22 to prevent unintended vertical movement of the container 12. The coupler 20 includes a canister or locking pin housing 32 which may include a removable cap 34 which is threaded in place. The canister 32 is attached by the weld about an opening in channel beam 26 and is shown at 36. A plunger assembly 38 is located within the canister 32 and includes a so-called piston 40 which is sized to fit within the inside diameter of the pin housing 32 and moves smoothly therein on its periphery which forms a bearing. Piston 40 is rotatable about a horizontal axis 41 shown in FIGS. 2,3. An eccentric pin 42 extends from the piston member 40 and provides the locking means which extends through opening 43 in beam 26 and fits within the corner casting slot 23 to hold the container securely in place. Pin 42 axis is spaced from axis 41. An operating rod 44 extends from the piston 40 through an opening in the cap 34. At the end of the rod 44, a handle member 46 is located and is of such a dimension that it has to be easily hand-grasped for rotating.

As shown in FIG. 2, cap 34 includes a slot or cutout 49 which permits a locking finger 48 to move therethrough. Thus, when handle 46 is moved from the position shown in FIG. 2, with locking pin 42 extending beyond the channel 26 to the position shown in FIG. 4, with eccentric pin 42 fully retracted, pin 42 is held in the retracted position after the loading lock finger 48 passes through slot 49 and is rotated 90° to prevent the pin from re-entering slot 23 of corner casting 22. Similarly, after a container is placed on the chassis 14, handle 46 may be rotated 90° to allow the loading lock finger 48 to re-enter the canister at which time stop pin 50 will contact the cap 34 to prevent further extension of the eccentric pin 42. A coil spring 52 is located within the canister and provides a biasing force between the piston 40 and the canister cap 34 for automatically urging the locking, eccentric pin 42 into an associated corner casting.

In operation, it is noted from the foregoing description of the structure, that once the container 12 is positioned on the truck chassis 14, dimensional variations can occur between locking slots 23 of each corner casting or with coupler spacing on chassis 14 and thus not provide the traditional, exact spacing as anticipated. In the event of a misalignment after loading a container, locking is achieved by rotating locking handle 46 to allow the loading finger 48 to enter the canister at which time eccentric pin 42 will contact a part of the corner casting 22 and not enter associated locking opening 23. In such a case, handle 46 is grasped and rotated until the eccentric pin 42 searches out and fits into the associated locking slot 23. A visual check can be made to determine if eccentric pin has entered the associated corner casting 23 by observing the location of locking handle 46 and stop pin 50. If these two members are not located adjacent or near canister cap 50, the operator is to rotate handle 46 until locking is accomplished and the handle 46 moves closer to cap 34.

Thus, it is noticed from the foregoing that a simple, reliable and inexpensive container coupler is provided which may easily be adapted to existing chassis as a replacement unit, or, used as original equipment. The biasing force provided by spring 52 constantly urges the piston 40 and the eccentric mounted pin 42 to locking engagement with a container corner casting and the rotational-eccentric feature allows the locking pin 42 to assume a number of positions to search for the slot 23 of a corner casting. Thus, any dimensional irregularities of the container 12 and/or chassis 14 can be compensated for to insure a safe, secure hold-down.

The foregoing description and drawings merely explain and illustrate the invention and the invention is not limited thereto, except insofar as the appended claims are so limited, as those who are skilled in the art and have the disclosure before them will be able to make modifications and variations therein without departing from the scope of the invention.

What is claimed is:

1. A variance compensating locking coupler for engaging and holding a corner casting of a container resting on a truck chassis, the improvement comprising:
    a housing securely attached to the chassis;
    manually reciprocable locking means located within said housing and having a first longitudinal axis, said locking means including;
    eccentric pin means having a second longitudinal axis spaced a distance from the first longitudinal axis and lockingly engageable with pin engagement means of the corner casting;
    handle means extending through one end of said housing;
    connecting means operatively joining the eccentric pin means and the handle means for linear and rotational movement within said housing;
    said housing providing bearing means for reciprocating the eccentric pin means between a retracted and extended position and for rotating the eccentric pin for alignment and locking into the associated corner casting.

2. The coupler of claim 1 wherein the housing includes:
    a biasing spring operatively associated with said eccentric pin means;
    removable end cap means with means adapted to provide a first stop for said spring;
    said connecting means providing a second stop for said spring means.

3. The coupler of claim 2 wherein said handle means includes:
    a rod with one end securely attached to said connecting means and a second end extending beyond the housing;
    said rod including loading lock means;
    said loading lock means being adapted for abutment with said end cap means for holding the eccentric pin in the retracted position within the housing.

4. The coupler of claim 1 wherein the connecting means operatively joining the eccentric pin means and the handle means includes:

a piston member mounted for reciprocating and rotational movement in said housing;
said piston member having a cylindrical body and a periphery engaging said bearing means.

5. The coupler of claim 1 and:

said chassis including pairs of transversely extending beam members;
said beam members providing a hollow portion;
said beam including abutment means for positioning the container adjacent thereto and each abutment means having transverse ends;
said abutment means including an opening at each transverse end;
said housing being securely attached about the opening for movement of the eccentric pin means between the retracted position within the housing to the extended position protruding through said opening.

6. The coupler of claim 1 wherein the handle means include:

rod means securely attached to the connecting means and having a first end extending through the housing;
said rod including loading locking means for abutment with the housing to hold the eccentric pin in a retracted position within said housing;
said rod also including stop means for abutment with the housing when the eccentric pin means is in the extended position.

7. A variance compensating locking device for securely connecting a corner casting of a container with a truck chassis and comprising:

housing means rigidly attached to the chassis,
eccentric pin means reciprocably movable within and projectionable from said housing means,
biasing means disposed within said housing means for urging said eccentric pin means to lockingly engage with pin engagement means of the corner casting, and
handle means for aligning said eccentric pin means for said locking engagement with said pin engagement means and retracting thereof from said engagement.

8. The locking device of claim 7, and loading lock finger means being disposed on said handle means and adapted to hold said eccentric means in a disengaged position.

9. The locking device of claim 7, and said housing means having an opening facing the corner casting,
the corner casting having an access opening facing said housing means, and said eccentric pin means being projectionable through said housing means opening into said access opening.

10. The locking device of claim 7, and handle lock means limiting said eccentric pin means travel into the corner casting.

11. The locking device of claim 7, and said eccentric pin means comprising a locking pin being projectionable from said housing means and into the corner casting, and
a piston being movable within said housing means and eccentrically connecting said locking pin with said handle means.

12. The locking device of claim 7, and said housing means having a cylindrical configuration with an opening at one end allowing said handle means to pass through and another opening at another end allowing said eccentric pin means to project therethrough.

* * * * *